United States Patent
Ogai (10) Patent No.: US 8,721,875 B2
(45) Date of Patent: May 13, 2014

(54) HOT-WATER SUPPLY SYSTEM

(75) Inventor: Fumio Ogai, Nagoya (JP)

(73) Assignee: Rinnai Corporation, Nagoya-Shi (JP)

(\*) Notice: Subject to any disclaimer, the term of this patent is extended or adjusted under 35 U.S.C. 154(b) by 0 days.

(21) Appl. No.: 13/822,029

(22) PCT Filed: Oct. 22, 2010

(86) PCT No.: PCT/JP2010/068704
§ 371 (c)(1),
(2), (4) Date: Mar. 11, 2013

(87) PCT Pub. No.: WO2012/053098
PCT Pub. Date: Apr. 26, 2012

(65) Prior Publication Data
US 2013/0168302 A1   Jul. 4, 2013

(51) Int. Cl.
*B01D 35/147* (2006.01)
*C02F 1/40* (2006.01)
*C02F 5/00* (2006.01)

(52) U.S. Cl.
USPC ............. 210/86; 210/103; 210/130; 210/138; 210/190; 210/191; 210/269

(58) Field of Classification Search
CPC .... B01D 35/147; B01D 35/1475; C02F 1/40; C02F 5/00
USPC ........... 210/86, 104, 139, 140, 190, 191, 270, 210/670, 687, 130, 138, 269, 103
See application file for complete search history.

(56) References Cited

U.S. PATENT DOCUMENTS

| | | | | |
|---|---|---|---|---|
| 3,687,289 A * | 8/1972 | Tischler | ............................ | 210/87 |
| 4,275,448 A * | 6/1981 | Le Dall | .......................... | 700/271 |
| 4,332,678 A * | 6/1982 | Spiegl | .............................. | 210/86 |
| 4,379,057 A * | 4/1983 | Meiser et al. | ................. | 210/662 |
| 4,470,911 A * | 9/1984 | Reinke | ........................... | 210/662 |
| 5,651,880 A * | 7/1997 | Johnson | ......................... | 210/126 |
| 5,910,244 A * | 6/1999 | Stamos et al. | ................. | 210/138 |
| 6,696,963 B2 * | 2/2004 | Zimmerman et al. | ......... | 340/612 |
| 7,563,362 B2 * | 7/2009 | Jeong | ............................. | 210/143 |
| 2006/0151365 A1 * | 7/2006 | Geisen et al. | .................... | 210/91 |
| 2009/0250397 A1 * | 10/2009 | Geisen et al. | ................. | 210/636 |

FOREIGN PATENT DOCUMENTS

| | | |
|---|---|---|
| JP | 63-300950 | 12/1988 |
| JP | 7-270213 | 10/1995 |
| JP | 8-141564 | 6/1996 |
| JP | 2000-274818 | 10/2000 |
| JP | 2002-143695 | 5/2002 |

(Continued)

*Primary Examiner* — Joseph Drodge
(74) *Attorney, Agent, or Firm* — Rankin, Hill & Clark LLP (57) ABSTRACT

A hot-water supply system includes a switching valve (35) which has a bypass circuit which bypasses the water softening device (30) by directly connecting the water supply pipe (P1) and the inlet pipe (P3) of a hot-water supply device to each other, and a control unit (50). The control unit (50) includes a switching valve drive circuit which switches the switching valve (35) to the mode in which water is supplied from the water supply pipe (P1) to the hot-water supply device (1) via the bypass circuit, based on the determination of the timing of salt replenishment, and a display drive circuit which displays intention, in which salt replenishment is needed, on a display portion (51) of a remote controller (RC).

8 Claims, 8 Drawing Sheets

(56) References Cited

FOREIGN PATENT DOCUMENTS

| JP | 2003-322411 | 11/2003 |
| JP | 2008-064019 | 3/2008 |
| JP | 2008-209067 | 9/2008 |
| JP | 2009-106871 | 5/2009 |

* cited by examiner

THIRD POSITION

FIG.4A FIRST POSITION

FIG.4B SECOND POSITION

FIG.4C THIRD POSITION

HOT-WATER SUPPLY SYSTEM

TECHNICAL FIELD

The present invention relates to a hot-water supply system which includes a water softening device, and particularly, to a hot-water supply system which maintains a predetermined water softening capacity by regenerating an ion exchange resin of a water softening device and recovering the water softening capacity (or ion exchange capacity) repeatedly.

BACKGROUND ART

Figure 7:
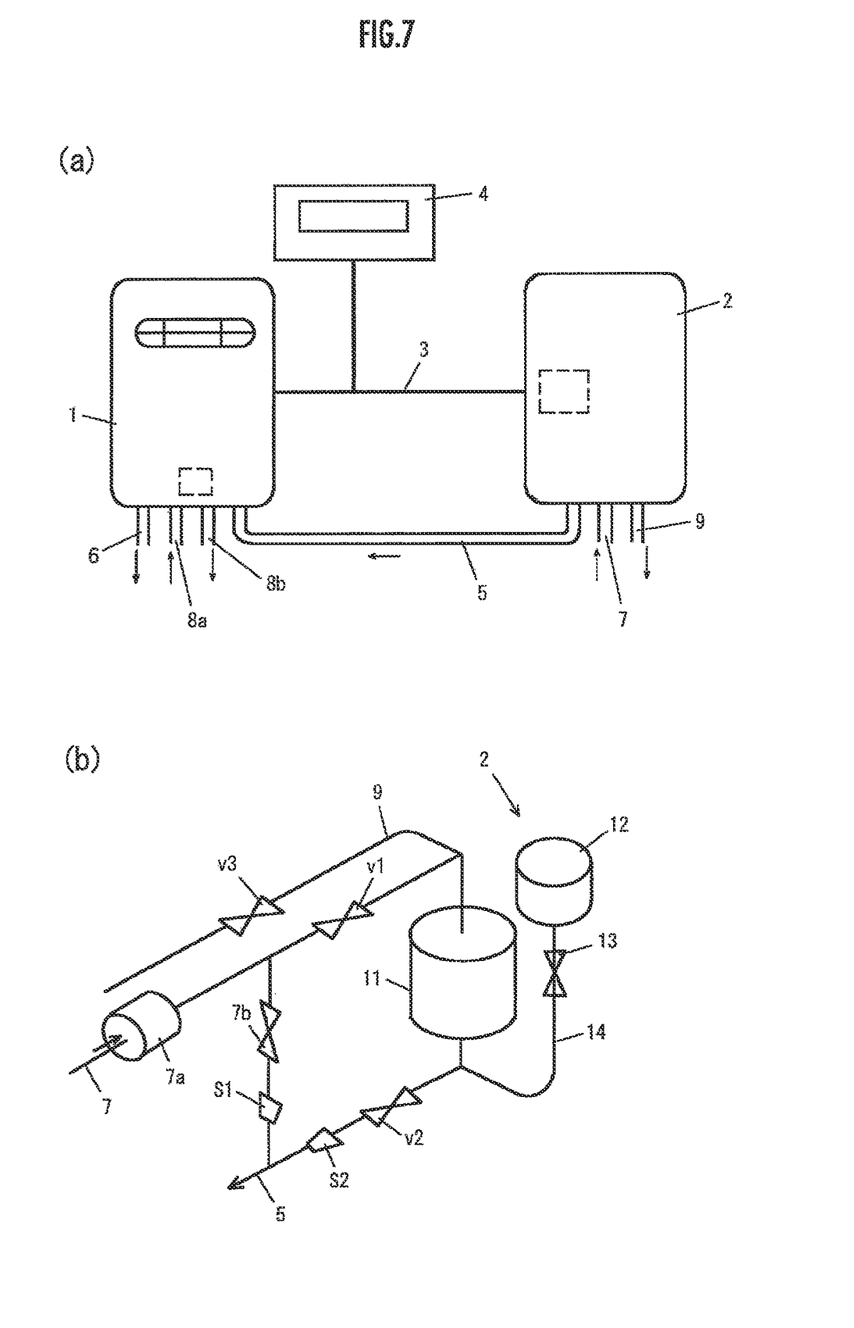
FIG. 7A is an overall configuration view of an example of a hot-water supply system of the related art which includes a water softening device.
FIG. 7B is a schematic view of a regeneration treatment device of the hot-water supply system.

In a hot-water supply system which includes a water softening device, there are various combinations of a hot-water supply device, a water softening device, and a regeneration device (specifically, a regeneration salt water supply device), and for example, an example of Patent Document 1 is as illustrated in FIG. 7.

In the hot-water supply system, a hot-water supply device 1 and a water softening device 2 are connected to each other by a data communication line 3, a remote controller 4 is connected to the data communication line 3, and the remote controller 4 controls the hot-water supply device and the water softening device.

The hot-water supply device 1 and the water softening device 2 are connected by a soft water supply pipe 5, and water, which passes through the water softening device 2 and is softened, is supplied to the hot-water supply device 1. The hot-water supply device 1 which is the example of the related art is a general device, and hot-water is supplied from a hot-water supply pipe 6. Moreover, in order to circulate the hot-water in a bathtub, the bathtub is connected by a return pipe 8a and a going pipe 8b.

The water softening device 2 includes a water softener 11 of an ion exchange resin and a regeneration salt water supply device 12, and the regeneration salt water supply device 12 is connected to the water softener 11 via a salt water supply valve 13 and a salt water supply pipe 14.

Water softening capacity due to the ion exchange resin of the water softening device 2 is decreased according to an increased amount of water softening treatment. Moreover, in order to recover the water softening capacity, it is necessary to supply salt water from the regeneration salt water supply device 12 and perform regeneration treatment, and the regeneration treatment is performed at fixed intervals automatically.

Moreover, in the related art, in order to not interfere with the hot water when the regeneration treatment is performed, a bypass valve 7b is connected to the downstream side of a pressure reducing valve 7a of a water supply pipe 7, the water supply pipe 7 is connected to the soft water supply pipe 5 via the bypass valve 7b, and thus, hard water is supplied to the soft water supply pipe 5 by opening the bypass valve 7b.

A water supply valve v1 is positioned between (at the upstream position of the water softener 11) a junction point of the water supply pipe 7 and the bypass valve 7b, and the hot-water supply device 1, a soft water supply valve v2 is positioned in the downstream position of the water softener 11, and a drain valve v3 is positioned in a drain pipe 9 of the water softener 11. Moreover, flow rate sensors S1 and S2 are positioned in the downstream position of the bypass valve 7b and the downstream position of the soft water supply valve v2 respectively.

During the regeneration treatment, the water supply valve v1 and the soft water supply valve v2 are closed, the water supply to the water softener 11 is interrupted, the salt water supply valve 13 and the drain valve v3 are opened, and salt water is supplied from the regeneration salt water supply device 12 to the water softener 11. The salt water which passes through the water softener 11 is discharged from the drain pipe 9 via the drain valve v3.

Moreover, one-time regeneration treatment ends within a predetermined time. A large amount of salt (for example, 20 kg) is replenished in the regeneration salt water supply device at once. However, if the regeneration treatment is repeated, since the salt is consumed and becomes deficient, it is necessary to appropriately replenish salt.

In addition, the regeneration treatment of the water softer 11 is appropriately performed, and thus, the water softening capacity is regenerated. However, the ion exchange resin is gradually deteriorated by repeating the regeneration treatment, and if the ion exchange resin is significantly deteriorated, it is necessary to exchange the ion exchange resin. Moreover, in a case of the ion exchange resin for home use, the service life is approximately 5 years.

However, if the regeneration treatment is not appropriately performed and the ion exchange resin is used in a state where the water softening capacity is decreased, the ion exchange resin is rapidly deteriorated, the regeneration capacity is decreased in a short time, and thus, it is necessary to exchange the ion exchange resin early.

Figure 8:
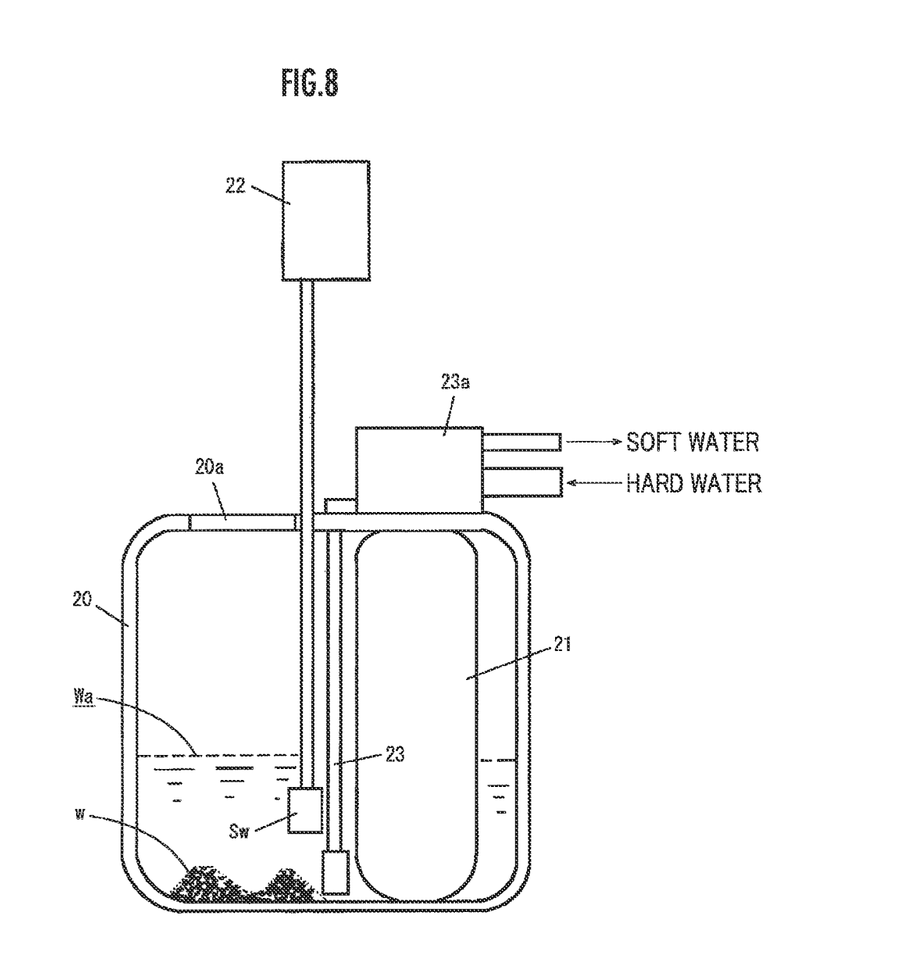
FIG. 8 is a cross-sectional view of another example of the related art of a regeneration treatment device.

On the other hand, the related art regarding the regeneration treatment of the similar water softening device is illustrated in FIG. 8 (Patent Document 2). In Patent Document 2, a resin tower 21 of a water softening device is disposed in a salt water tank 20, and a large amount of salt w is accommodated in the salt water tank 20. In the configuration of FIG. 8, water is supplied to the salt water tank, a predetermined amount of salt water Wa is generated, and the generated salt water is sucked up by a supply pipe 23, supplied to the resin tower 21 (water softener 11, the same as the water softening device), and regenerated.

In the configuration, an electrode Sw, which measures concentration of the salt water in the salt water tank 20, and a control unit are provided, and an alarm 22 which informs a timing in which the salt is to be replenished (the timing of salt replenishment), when such timing arrives, or the like is provided.

Water softening treatment and regeneration treatment are repeated automatically by switching a switching valve 23a. However, if the salt w in the salt water tank 20 is gradually consumed and becomes deficient, the concentration of the salt water after the regeneration treatment is suddenly decreased. Moreover, if the concentration of the salt water is less than or equal to a predetermined value, the alarm 22 is operated and informs that the replenishment of the salt w is needed.

The related art of Patent Document 2 is as described above. However, even when the alarm 22 informs that the salt replenishment is needed, the regeneration treatment is performed in a state where the salt is not replenished, and thereby, the water softening device may be used in a state where the ion exchange resin of the water softening device is not regenerated. Therefore, since the ion exchange resin is used in a state where the water softening capacity is decreased due to deficiency of the salt, the above-described problems occur due to early deterioration of the ion exchange resin.

Moreover, there is also an invention which extends a useful life of the ion exchange resin as long as possible by limiting the use of the water softening device to a necessary extent (Patent Document 3). In the related art of Patent Document 3, a bypass valve which bypasses a water softening device is provided, and for example, in a case where soft water is not needed, particularly such as hot-water for a kitchen, hot-water for a shower, bathroom heating, and hot water for bathtub, or the like, the bypass valve is opened, and thereby, the water softening device is not used.

As described above, in the hot-water supply systems which include the water softening devices of the related art, there is a problem in that the salt for the regeneration treatment becomes deficient, and the regeneration capacity of the ion exchange resin of the water softening device becomes rapidly decreased. Thereby, the water supply system is often used in a state where the water softening is not performed.

PRIOR ART DOCUMENTS

Patent Documents

Patent Document 1: Japanese Patent Application Laid-Open No. 2009-106871
Patent Document 2: Japanese Patent Application Laid-Open No. H08-141564
Patent Document 3: Japanese Patent Application Laid-Open No. 2000-274818

SUMMARY OF THE INVENTION

Problem to be Solved by the Invention

Generally, salt water is used as a regenerant. However, potassium chloride or the like may be used as the regenerant. In descriptions below, "salt" and "salt water" mean salt and salt water which are representatives of the regenerant used in the water softening device of the hot-water supply system.

The present invention is premised on a hot-water supply system which includes a hot-water supply device and a water softening device, in which the water softening device includes a regeneration salt water supply device, and in which an ion exchange resin of the water softening device is repeatedly regenerated and soft water is stably supplied. Moreover, an object of the present invention is to prevent early deterioration of the ion exchange resin due to deficiency of salt of a regeneration salt water supply device before the deterioration occurs, and thereby, to securely prevent the service life of the ion exchange resin from being significantly shortened, and to prevent a trouble of a hot-water supply by a very simple means even in a state of salt deficiency.

Means for Solving the Problem

Solutions of the present invention include the following configurations (i) to (vii) on the premise of the hot-water supply system.

That is, the solutions include:

(i) a regeneration salt amount determination unit which determines an amount of salt in the regeneration salt water supply device;

(ii) a switching valve which is positioned at the upstream side of the water softening device, is connected to a water supply pipe which supplies water to the water softening device and a soft water supply pipe which supplies soft water generated by the water softening device to the hot-water supply device, and includes a bypass circuit which bypasses the water softening device by directly connecting the water supply pipe and the soft water supply pipe; and (iii) a control unit of the switching valve, the control unit includes:

(iv) a storage unit which stores a salt replenishment reference of the regeneration salt water supply device;

(v) a calculation circuit which determines a timing of salt replenishment based on the amount of salt in the regeneration salt water supply device determined by the regeneration salt amount determination unit, and the salt replenishment reference;

(vi) a switching valve drive circuit which switches the switching valve to a mode, in which the water softening device is bypassed by the bypass circuit and water is directly supplied from the water supply pipe to the hot-water supply device, based on the timing of salt replenishment which is determined by the calculation circuit; and (vii) a display drive circuit which displays intention of necessity for salt replenishment on a display portion of a remote controller of the hot-water supply system based on the timing of salt replenishment which is determined by the calculation circuit.

When the amount of the water softening treatment is increased and thus, water softening capacity of the ion exchange resin is decreased, in order to regenerate the ion exchange resin, the switching valve is switched by the control unit, and the regeneration treatment of the ion exchange resin starts. At this time, salt water is supplied from the regeneration salt water supply device to the water softening device, and the salt water which passes through the water softening device is discharged from a drain pipe. Moreover, the configuration of the switching valve may be contrived so that the switching between two passages is performed by a single switching valve, that is, by a switching valve which includes a plurality of ports and a plurality of positions. However, the switching may be performed using a plurality of valves having two or more valves.

Meanwhile, when the amount of the salt of the regeneration salt water supply device is consumed and is decreased to the salt replenishment reference, it is determined to be the timing of salt replenishment by the calculation circuit, which is displayed on the display portion of the remote controller by the display drive circuit. The salt of the regeneration salt water supply device being deficient is displayed on the display portion of the remote controller, and thereby, a user is encouraged to replenish salt. Therefore, it is prevented that water softening treatment is performed in a state where ion exchange resin is not regenerated due to deficiency of salt and thus, the regeneration capacity of the ion exchange resin is rapidly deteriorated.

Moreover, when the timing of the salt replenishment is determined by the calculation circuit, the switching valve is switched to a mode in which the switching valve drive circuit of the control unit is operated and water is directly supplied to the hot-water supply device.

Therefore, after the timing of the salt replenishment is displayed on the remote controller, even when salt is not replenished in the regeneration salt water supply device and the hot-water supply system is used, in this case, since the water softening device is bypassed, the ion exchange resin being rapidly deteriorated is prevented before the deterioration occurs.

[Embodiment 1]

As the regeneration salt amount determination unit which detects the amount of the salt of the regeneration salt water supply device, for example, Embodiment 1 uses a regeneration salt water concentration sensor or a measurement sensor and has an advantage in which the deficiency state of the salt is able to be correctly determined.

Moreover, as the regeneration salt amount determination unit, a means, which detects consumption of salt from the frequency of the regeneration treatment and estimates the timing in which the salt is deficient, is able to be also used.

That is, based on the premise that one-time regeneration treatment is performed during a given time period, a constant amount of salt is consumed, and thus, a constant amount of salt is replenished in the regeneration salt water supply device by one-time replenishment, the frequency of the regeneration treatment is measured by a counter, and the timing of the salt replenishment is determined based on the counted value of the regeneration treatment. In this case, the timing of the salt replenishment is determined by the frequency of the regeneration treatment and the reference value. This also is one of Embodiment 1.

EXAMPLE 2

There are various methods which supply salt water to the ion exchange resin and regenerate the ion exchange resin. Patent Documents 1 and 2 describe an example of various methods. In Patent Documents 1 and 2, the salt water is supplied to the water softening device by an electric motor. On the other hand, in Example 2, a nozzle is provided in the switching valve and thus, a jet pump (or an eject pump) is configured, the salt water in the regeneration salt water supply device is drawn up by water flow of the water supply and is mixed with the supplied water, and the mixed water is supplied to the water softening device. Thereby, the switching valve is switched to the regeneration treatment process, and the supply of the salt water from the inner portion of the regeneration salt water supply device to the water softening device is able to be performed by the switching operation of the switching valve without using a pump.

According to Embodiment 2, the switching to the water supplying and the operation of supplying the salt water in the regeneration treatment process become simple.

BRIEF DESCRIPTION OF DRAWINGS

FIG. 6A is an operation flowchart of a water softening device or the like.

FIG. 6B is another operation flowchart of the water softening device or the like.

MODE FOR CARRYING OUT THE INVENTION

Figure 1:
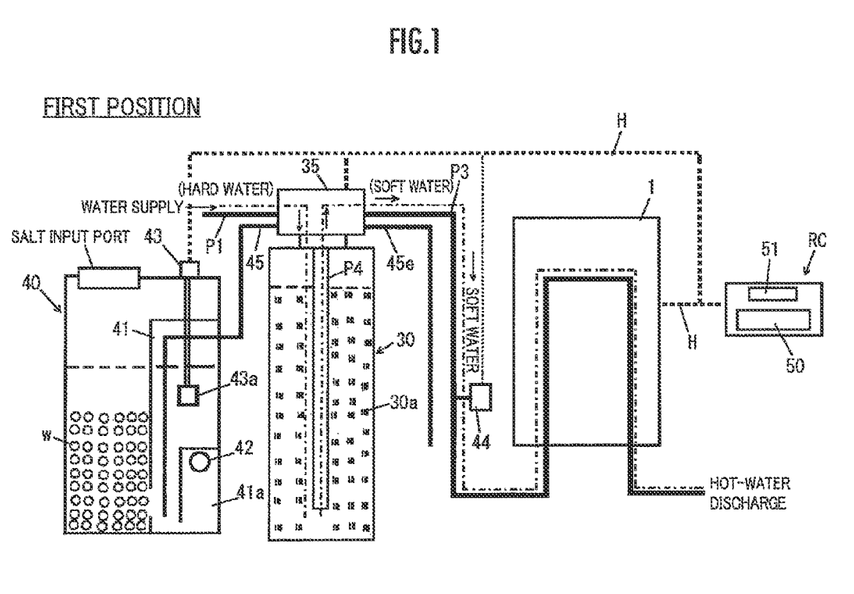
FIG. 1 is a schematic view of a configuration of Example 1 and illustrates a water passing-through state during water softening treatment.

Examples of a hot-water supply system for home use (specifically, for four families use) according to the present invention will be described with reference to FIGS. 1 to 6B. An outline of an overall system of Example is illustrated in FIG. 1.

EXAMPLE 1

Example 1 includes a hot-water supply device 1, a water softening device 30, and a regeneration salt water supply device 40, and a switching valve 35 is disposed on the water softening device 30.

The regeneration salt water supply device 40 includes a divided chamber 41, a water level detection chamber 41a is provided in the divided chamber, and a water level detection unit 42 is provided in the water level detection chamber 41a. A lower end of a salt water suction pipe 45 reaches a bottom portion of the divided chamber 41, and an upper end of the salt water suction pipe 45 is connected to a third inlet 35c of the switching valve 35. The third inlet 35c selectively communicates with a first passage (a passage which communicates with a first outlet 35d) 36a of the switching valve 35.

Figure 4A:
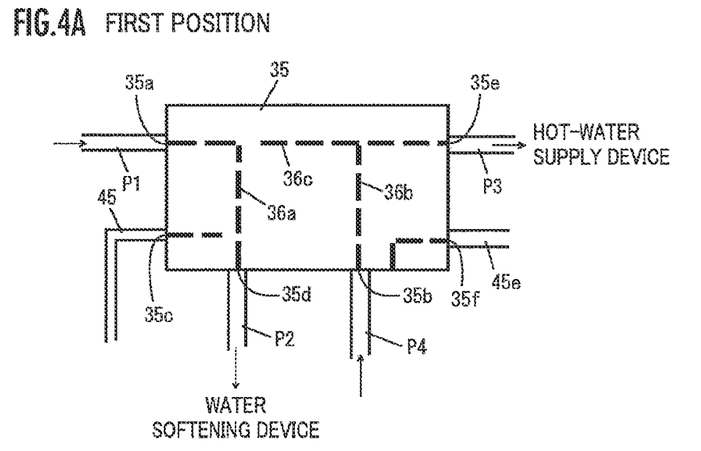
FIG. 4A is a schematic view of a first position of a switching device.
Figure 4B:
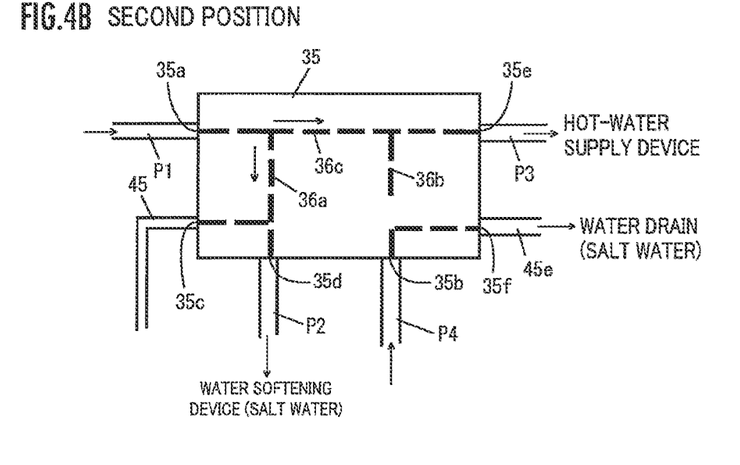
FIG. 4B is a schematic view of a second position.
Figure 4C:
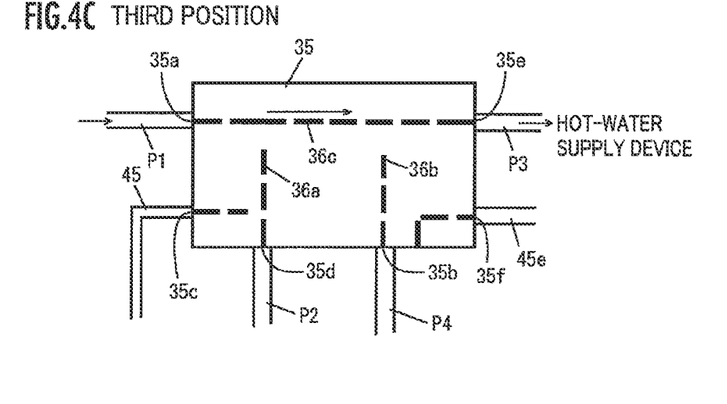
FIG. 4C is a schematic view of a third position.

The basic configuration of the switching valve 35 is as follows (FIG. 4).

The number of the inlets of the switching valve 35 is three, and the number of the outlets is three. Moreover, a water supply pipe P1 is connected to a first inlet 35a, a return pipe P4 of the water softening device 30 is connected to a second inlet 35b, and the upper end of the salt water suction pipe 45 is connected to the third inlet 35c. Moreover, an inlet pipe P2 to the water softening device 30 is connected to the first outlet 35d, an inlet pipe P3 of the hot-water supply device (an inlet pipe to the hot-water supply device) which is a soft water supply pipe is connected to a second outlet 35e, and a salt water discharging pipe 45e is connected to a third outlet 35f.

The switching valve 35 includes three switching positions. The switching valve is positioned at a first position normally and is switched from the first position to a second position and a third position by a switching valve drive circuit 50y of a control unit 50 of a remote controller RC. The shape or the specific structure of the switching valve 35 such as a shift valve, a rotary valve, or the like may not be limited as long as necessary switching ports are provided. Moreover, the control unit 50 may be provided inside the hot-water supply device 1.

When the switching valve 35 is positioned at the first position, the first inlet 35a communicates with the first outlet 35d, and the second inlet 35b communicates with the second outlet 35e (FIG. 4(a)).

When the switching valve is switched to the second position, the first inlet 35a communicates with the first outlet 35d via the first passage 36a, the third inlet 35c communicates with the first passage 36a, and the second inlet 35b communicates with the third outlet 35f. Moreover, at this time, the first inlet 35a also communicates with the second outlet 35e via the third passage 36c (FIG. 4(b)).

When the switching valve is switched to the third position, the first inlet 35a communicates with the second outlet 35e, and on the other hand, the first outlet 35d, the second inlet 35b, the third inlet 35c, and the third outlet 35f are closed (FIG. 4(c)).

With reference to FIG. 1, the water softening device 30 is not a particular device, and in the water softening device, an ion exchange resin 30a (specifically, a high molecular compound in which copolymer of styrene-divinyl benzene is sulfonated) is filled, and the return pipe P4 extends to the bottom thereof. Moreover, in the water softening device 30, if water (hard water) is injected from the upper portion, the injected water is ion-exchanged and softened while descending inside the ion exchange resin 30a, flows into the return pipe P4 at the bottom portion, and flows out to the hot-water supply device 1 from the second outlet 35e.

The remote controller RC is connected to the hot-water supply device 1 by a communication line H, and the control unit 50 is connected to the switching valve 35 by the communication line H.

In addition, in Example 1, an electrode 43a of a salt water concentration sensor 43 is inserted into the divided chamber 41 of the regeneration salt water supply device 40, and the salt water concentration sensor 43 is connected to the control unit 50 by the communication line H.

A water supply valve (not shown) for generating salt water is provided in the regeneration salt water supply device 40, the water supply valve is opened by the control unit 50, and thus, a predetermined amount (18 liters in Example 1) of water is injected, and the same amount of salt water is generated. The control of the injected water amount may be controlled by flow rate data of the injected water, water level data, or the like. However, for simplicity of the equipment, in Example 1, a valve opening time of the water supply valve is controlled.

In addition, a nozzle for a jet pump is provided in the first passage 36a of the switching valve 35, and the third inlet 35c selectively communicates with the nozzle. When the switching valve is positioned at the second position, the third inlet communicates with the nozzle, and the salt water in the regeneration salt water supply device is sucked up by high-speed flow of the first passage 36a. Moreover, the jet pump is formed by a venturi structure, the venturi structure is a common knowledge for a person skilled in the art, and thus, the illustration and the detailed description of the structure are omitted.

Moreover, the water level detection unit 42 (for example, a float type limit switch) is provided in the water level detection chamber of the regeneration salt water supply device 40, and the detection unit 40 is turned ON if the water level rises to a predetermined level, and the detection unit is turned OFF if the water level falls to a predetermined level. The generation of the salt water and completion of the flowing-out of the regeneration salt water are confirmed by ON and OFF of the water level detection unit 42, and when the water level detection unit is not turned ON or OFF as scheduled, it is determined to be a water supply error or a salt water supply error by the control unit, and errors are displayed on a display portion 51 of the remote controller RC.

[Normal Operation]

The switching valve 35 is positioned at the first position during a normal operation, the water from the water supply pipe P1 is supplied to the inlet pipe P2 (refer to FIG. 4) of the water softening device 30, ion-exchanged by the ion exchange resin 30a, and softened, and the softened water is supplied to the hot water supply device 1 via the return pipe P4 of the water softening device 30 and the inlet pipe P3 of the hot-water supply device (FIG. 1).

Moreover, in Example, it is assumed that the capacity of the water softening device and the capacity of the regeneration salt water supply device are 18 liters, the hardness of the supplied water is 44.6 ppm, the hardness of the water after the water softening treatment is 0.01 ppm, and the amount of the supplied hot-water is 1.0 m³ in a day on average.

[Regeneration Treatment]

Figure 2:
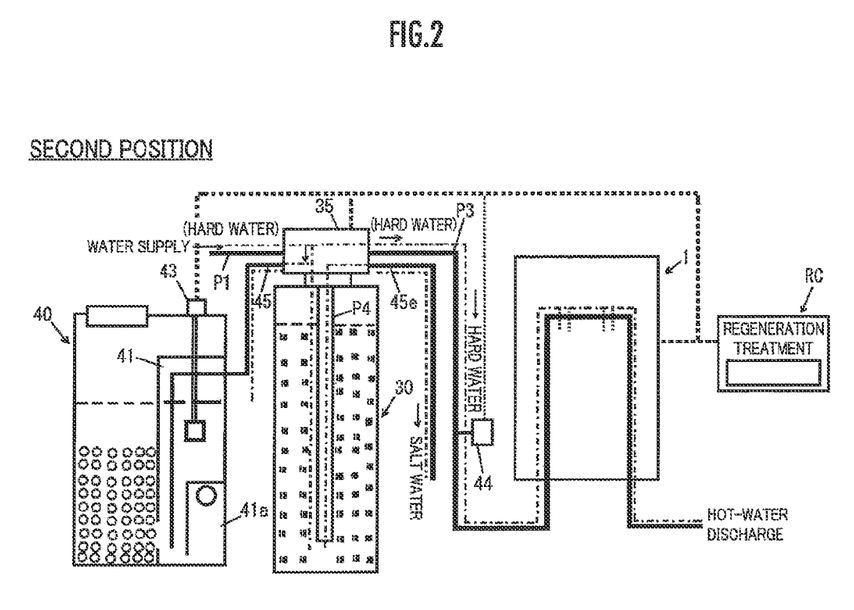
FIG. 2 is a view illustrating a water passing-through state during regeneration treatment of an ion exchange resin.

If a normal operation is continued and the amount of the water softening treatment (for example, accumulated operation time after the regeneration treatment of the water softening device, which is stored in a storage unit 50m of the control unit) reaches a predetermined regeneration reference, it is determined to be a regeneration treatment timing of the ion exchange resin. Moreover, the regeneration treatment timing is stored in an operation storage unit 50c, the switching valve drive circuit 50y of the control unit 50 of the remote controller RC is operated, the switching valve 35 is switched from the first position to the second position, and "regeneration treatment" is displayed on the display portion 51 of the remote controller RC (FIG. 2). In addition, in the beginning of the regeneration treatment process, as described above, a predetermined amount (18 liters) of water is supplied to the regeneration salt water supply device 40, and the same predetermined amount of salt water is generated.

When the "regeneration treatment" is displayed on the display portion of the remote controller RC, at the second position of the switching valve 35, water directly passes through from the water supply pipe P1 to the inlet pipe P3 of the hot-water supply device and is supplied to the water softening device 30 via the first passage 36a and the inlet pipe P2. Moreover, the third inlet 35c communicates with the nozzle of the jet pump (not shown) of the first passage 36a in the switching valve 35, and the regeneration salt water is sucked from the salt water suction pipe 45 into the first passage 36a and is supplied to the water softening device 30 along with the supplied water via the first passage 36a.

The salt water which passes through the water softening device 30 is discharged from the salt water discharging pipe 45e via the return pipe P4 and the second inlet 35b and the third outlet 35f of the switching valve 35. If the regeneration treatment (the generation of the ion exchange resin 30a due to the salt water and washing due to the supplied water) ends, the amount of the water softening treatment (or the operation time) which is recorded in the storage unit 50m is reset, and the switching valve 35 is switched to the first position by the switching valve drive circuit 50y of the control unit 50.

[Salt Replenishment]

If the normal operation and the regeneration treatment are repeated normally as described above, the water softening treatment is appropriately performed, and the expected soft water is continuously supplied. However, according to repetition, salt w in the regeneration salt water supply device 40 is consumed and becomes deficient.

If the salt w input to the regeneration salt water supply device 40 is consumed and becomes deficient, the concentration of the salt water in the divided chamber 41 is decreased to equal to or less than a predetermined value. The concentration of the salt water is detected by the salt water concentration sensor 43 which is a regeneration salt amount determination unit, and the timing of the salt replenishment is determined by a calculation circuit 50b of the control unit 50, based on the detected results and a salt water concentration reference value which is a salt replenishment reference stored in the storage unit 50m of the calculation circuit 50b.

Figure 3:
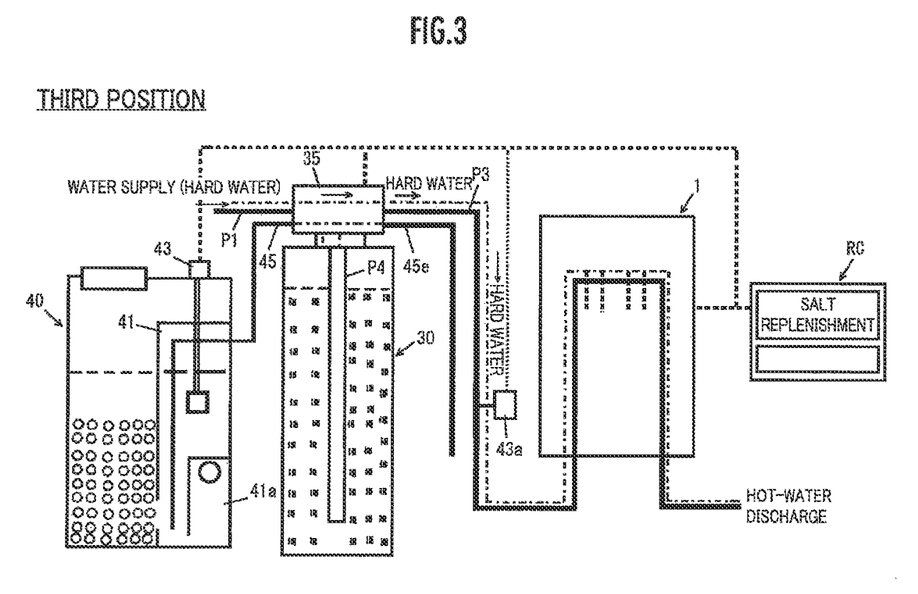
FIG. 3 is a view illustrating a water passing-through state after a service life of the ion exchange resin elapses.

If it is determined to be the timing of the salt replenishment, the "salt replenishment" is stored in the operation storage unit 50c, and the switching valve 35 is switched to the third position by the switching valve drive circuit 50y of the control unit 50. In the third position, the first inlet 35a communicates with the second outlet (connecting port of the inlet pipe P3 of the hot-water supply device) 35e via the third passage 36c. However, other inlets and outlets are closed, the water softening device becomes a bypassed state, and at this time, the "salt replenishment" is displayed on the display portion 51 of the remote controller RC (FIG. 3).

If the salt is replenished and the concentration of the salt water is recovered, which is confirmed by the calculation circuit 50b, the detected value of the salt water concentration sensor 43, which is a regeneration salt amount determination unit, is reset. Moreover, the switching valve drive circuit 50y of the control unit 50 is operated, the switching valve 35 is switched to the first position, the display of the remote controller RC is reset, and the normal operation is returned.

[Water Softening Stop Operation]

Even when the regeneration treatment is normal, the salt replenishment is appropriately performed, and the water softening treatment is continued, a restoring force of the ion exchange resin 30*a* is gradually decreased, and as a result, the function becomes deficient. In this way, at the case of Example 1, the service life of the ion exchange resin is approximately 5 years if the ion exchange resin is approximately used. However, the ion exchange resin is used in a state where the regeneration treatment is not appropriately performed, the water softening capacity is rapidly deteriorated to the level in which the capacity is not recovered, and the function is fails in a short period.

A degree of the deterioration of the ion exchange resin is able to be measured by various methods. One method is that the service life reference when the ion exchange resin is continuously used under assumed actual use conditions is determined based on empirical rules, test results, or the like and the service life timing is determined from the determined service life reference and the practical use time, and another method is that regeneration marginal frequency of the ion exchange resin is determined and the service life is determined based on the regeneration marginal frequency.

Moreover, the service life timing is able to be determined from the recovery level of the ion exchange resin due to the regeneration treatment, reduction speed of the water softening capacity after the regeneration treatment, or the like. The former by empirical rules is a method which schematically determines the service life timing, and the latter is a method which directly estimates and determines an actual service life, that is, an application limit.

The determination of the service life of Example 1 is performed by the latter method. Specifically, the determination is performed as follows.

That is, a hardness meter 44 is provided in the inlet pipe P3 of the hot-water supply device between the water softening device 30 and the hot-water supply device 1, and according to a sampling, the hardness of the softened water is measured by the hardness meter, and the water softening capacity is measured. Moreover, according to the water softening capacity, a capacity recovery level of the ion exchange resin after the regeneration treatment is estimated, and the service life of the ion exchange ion is determined based on the estimated results and the service life reference.

Moreover, the water softening capacity is measured at fixed intervals, the measured values are stored in the storage unit 50*m* of the calculation circuit 50*b* (refer to FIG. 5), the reduction speed (deterioration speed of ion exchange resin) of the water softening capacity is estimated from a temporal change after the regeneration treatment, the service life timing may be also determined from the estimated result and the service life reference.

Moreover, the method, which determines the service life by time data based on empirical rules, has a premise in that the regeneration treatment is appropriately repeated in a predetermined manner, and the method is an effective method as long as the premise is satisfied. On the other hand, the method which determines the service life from the recovery level of the water softening capacity of the ion exchange resin does not need the above-described premise. However, since the water softening capacity is measured and the recovery level estimation is needed, the method is less simple compared to the former method.

Figure 5:
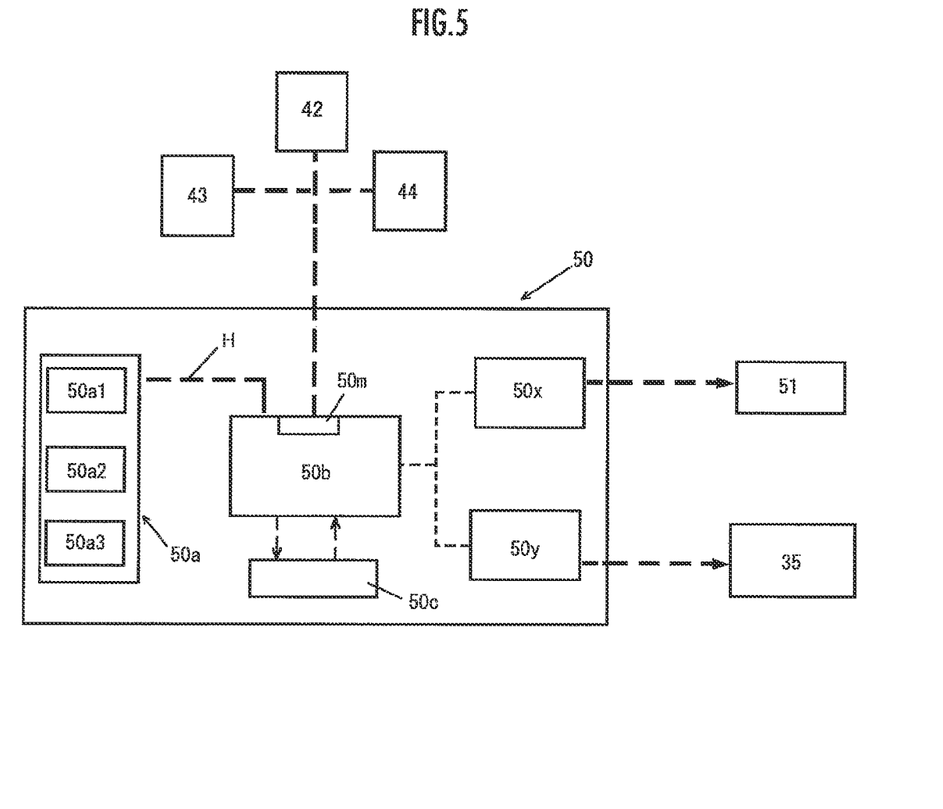
FIG. 5 is a schematic view of a control unit.

With reference to FIG. 5, the hardness measurement results from the hardness meter 44 are transmitted to the control unit 50, and the service life determination is performed by the calculation circuit 50*b*. When it is determined to be the service life timing, the "resin service life" or the like is displayed on the display portion 51 of the remote controller RC, and the switching valve 35 is switched to the third position (refer to FIG. 4(*c*)) by the switching valve drive circuit 50*y* of the control unit 50.

In the third position, the first inlet 35*a* communicates with the second outlet (the connecting port of the inlet pipe P3 of the hot-water supply device) 35*e* via the third passage 36*c*, other inlets and outlets are closed, and the water softening device 30 is bypassed.

[Configuration of Control Unit]

The configuration of the control unit is as illustrated in FIG. 5.

The control unit 50 includes a reference storage unit 50*a*, the calculation circuit 50*b*, the switching valve drive circuit 50*y*, and a display drive circuit 50*x*.

The reference storage unit 50*a* includes a regeneration reference storage unit 50*a*1, a salt water concentration reference storage unit 50*a*2, and a service life reference storage unit 50*a*3, and the units are connected to the calculation circuit 50*b* by the communication line H. Moreover, the salt water concentration sensor 43 and the hardness meter 44 are connected to the storage unit 50*m* of the calculation circuit 50*b*. In addition, the display drive circuit 50*x* and the switching valve drive circuit 50*y* are connected to the calculation circuit 50*b*.

Moreover, the control unit 50 includes the operation storage unit 50*c*, and various data with respect to operation conditions is stored in the operation storage unit 50*c*. The data is read by the calculation circuit 50*b* at the time of the starting of hot-water, or the like, and soundness of the overall system and operation history are confirmed based on the read data.

The configuration is operated as described above, and the switching valve 35 are selectively switched to the first position, the second position, and the third position by the control unit 50, which are displayed on the display portion 51 of the remote controller RC as described above.

[Operation of Water Softening Device or the Like]

Figure 6A:
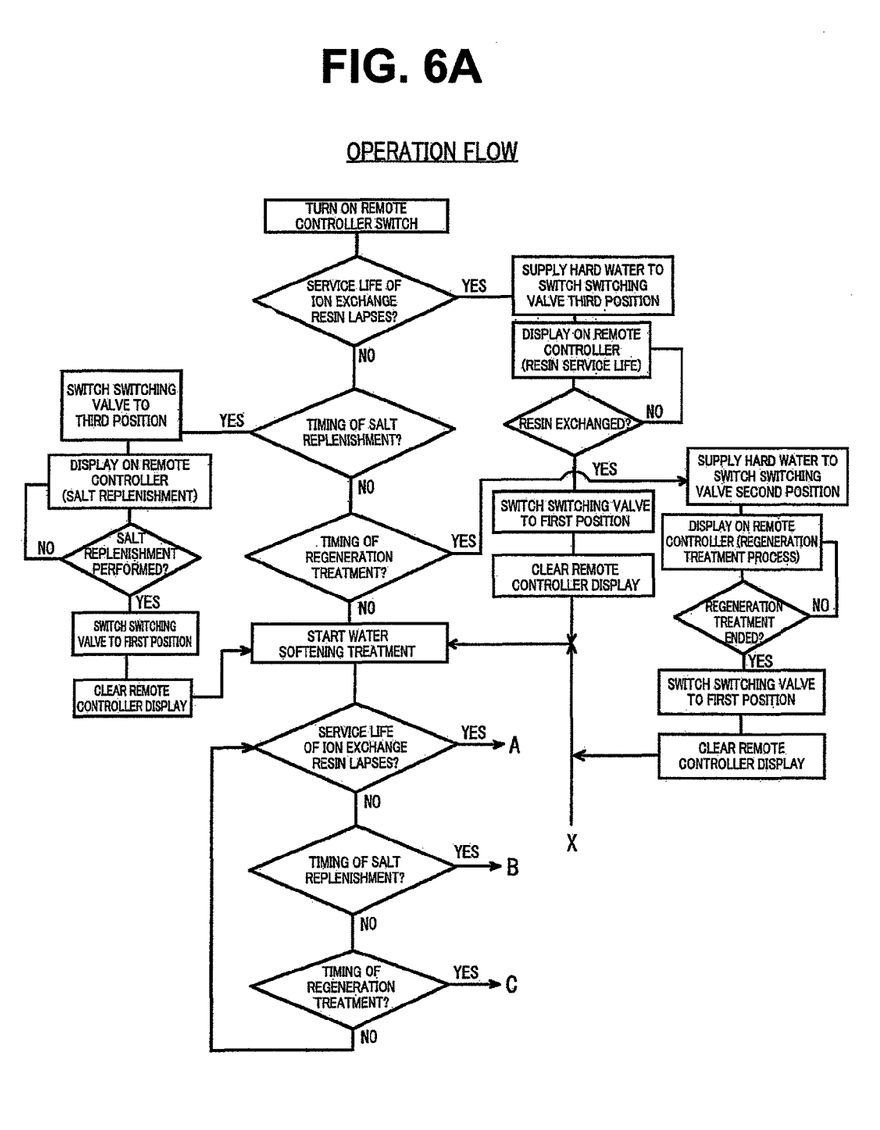
Figure 6B:
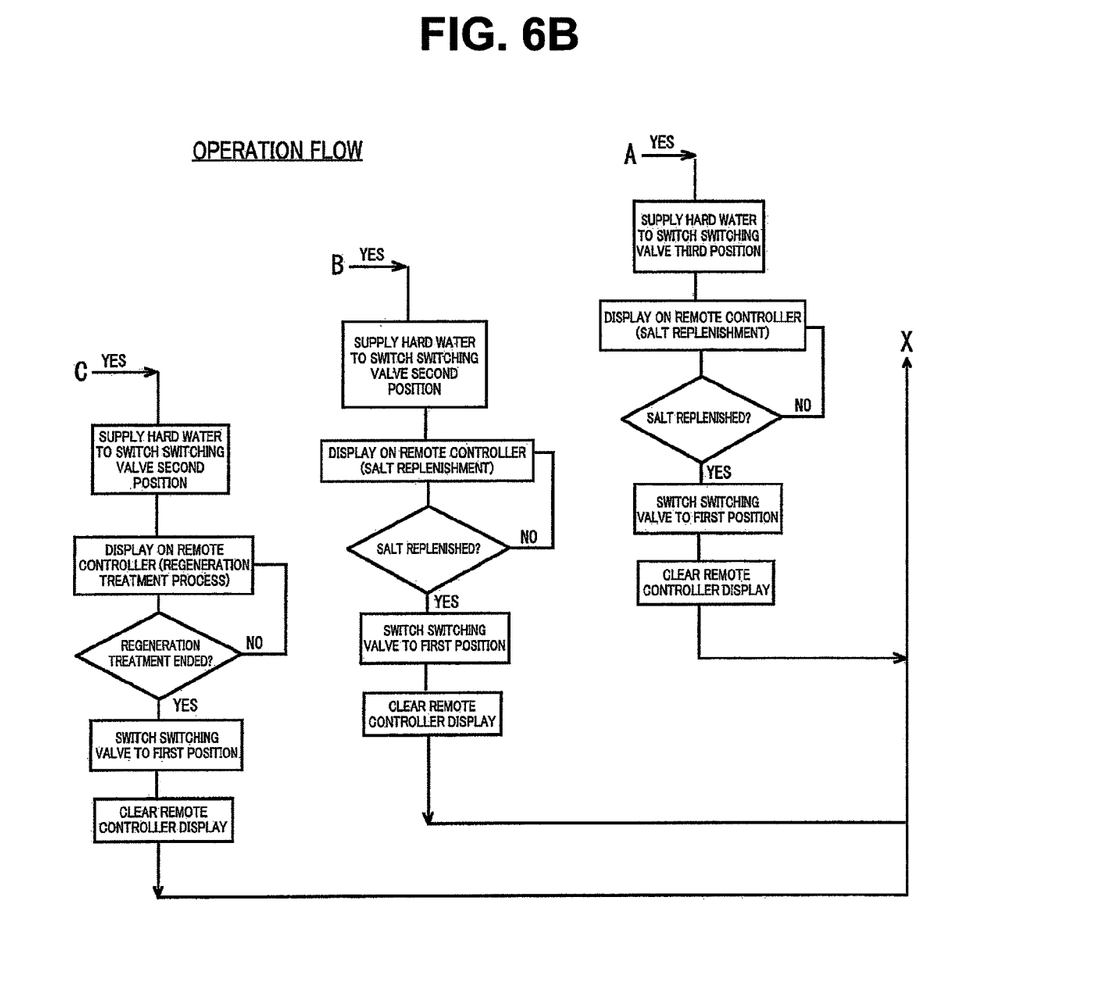

An operation flow of the water softening device 30 and the regeneration salt water supply device 40 is as illustrated in FIGS. 6A and 6B.

The remote controller switch of the hot-water supply system is turned on, and the control unit 50 confirms whether or not the service life of the ion exchange resin of the water softening device 30 elapses, whether or not it is the timing of the salt replenishment to the regeneration salt water supply device 40, and whether or not it is the timing of the regeneration treatment, based on each reference value which is saved in the storage unit 50*m*. Moreover, when there is no problem in the above conditions, the water softening treatment, in which the switching valve 35 is positioned on the first position, is continued.

If the service life of the ion exchange resin elapses, the "resin service life" is stored in the operation storage unit 50*c*, the switching valve is switched to the third position, and the "resin service life" is displayed on the display portion 51 of the remote controller. In addition, if the ion exchange resin is exchanged, the detected values of the hardness meter 44 are reset (manual reset, or automatic reset after the recovery of the water softening capacity), the switching valve 35 is returned to the first position, the water softening treatment starts, and the display of the "resin service life" of the remote controller is cleared.

Similarly, also at the timing of the salt replenishment, the switching valve 35 is switched to the third position, and the "salt replenishment" is displayed on the remote controller. Moreover, the salt replenishment is performed, and if the recovery of the concentration of the salt water is confirmed or a reset operation is performed, the detected values of the salt water concentration sensor 43 are reset. Moreover, the switching valve 35 is returned to the first position, it becomes the water softening treatment state, and the display of the "salt replenishment" of the remote controller is cleared.

Similarly, also during the timing of the regeneration treatment, the "regeneration treatment" is stored in the operation storage unit 50c, the switching valve 35 is switched to the second position, and the "regeneration treatment" is displayed on the display portion 51 of the remote controller. In addition, if the regeneration treatment ends, the amount of the water softening treatment which is stored in the storage unit 50m is cleared, the switching valve 35 is returned to the first position, the water softening treatment is possible, and the display of the "regeneration treatment" of the remote controller is cleared.

Even during the water softening treatment, "whether or not it is the resin service life", "whether or not it is the timing of the salt replenishment", and "whether or not it is the generation treatment timing" are repeatedly checked. The operation flow is as illustrated in FIG. 6B, and when the "resin service life" is determined and when the "salt replenishment" is determined during the operation, the switching valve 35 is switched to the third position, and the "resin service life" or the "salt replenishment" is displayed on the remote controller. Moreover, if the resin exchange or the salt replenishment is achieved, the switching valve 35 is returned to the first position, and the display of the remote controller is cleared.

Moreover, if the timing of the "regeneration treatment" reaches, the switching valve 35 is switched to the second position, the "regeneration treatment" is displayed on the remote controller, and if the regeneration treatment process ends, the switching valve 35 is returned to the first position, and the display is cleared.

EXAMPLE 2

Next, Example 2 will be described.

In Example 2, the determination of the timing of the regeneration treatment, the determination of the timing of the salt replenishment, and the determination of the service life of the ion exchange resin are performed by a simple method based on empirical rules. Since the method has a premise in that the regeneration treatment and the salt replenishment are performed in a predetermined manner (a predetermined salt is replenished by a predetermined amount, or the like), if the regeneration treatment and the salt replenishment are not performed in a predetermined manner, the service life of the ion exchange resin is damaged. However, the salt replenishment is demanded due to the display on the remote controller, the display is continued until the salt is replenished, and thus, it is considerably expected that the salt is immediately replenished. Moreover, since the water softening device is bypassed until the salt is replenished and the hot-water operation is performed, there is no problem in that the restoring force is rapidly deteriorated. If the above-described matter is considered, even though the salt replenishment is slightly delayed, since the service life of the ion exchange resin is not largely shortened due to the slight delay, the loss in the practical use is decreased.

(1) Determination of Regeneration Treatment Timing

In the hot-water supply system (for family of four use) similar to Example 1, on the premise that the overall hot-water supply is softened, the relationship between the hardness of the water supply and the amount of the water softening treatment is represented by empirical values according to the product of the operation time and the flow rate, the regeneration treatment interval is empirically set to two weeks from the relationship of the empirical values and the ion exchange resin regeneration reference, and it is determined to be the generation treatment timing when two weeks elapse.

Premise (i) An assumed hot-water flow rate for one day is $1.0\ m^3$.

(ii) An assumed supplied water hardness is 44.6 ppm.

(2) Determination of Timing of Salt Replenishment

As the regeneration salt amount determination unit which detects the amount of salt, using the frequency of the "regeneration treatment" which is stored in the operation storage unit 50c whenever it is determined to be the generation treatment timing, the salt replenishment reference is set to 10-times regeneration treatment, it is determined to be the timing of salt replenishment when the tenth regeneration treatment ends.

Premise (i) Salt of 2.5 kg is consumed by one-time regeneration treatment.

(ii) One-time salt replenishment amount is set to 25 kg.

(3) Determination of Service Life of Ion Exchange Resin

It is assumed that the useful life is set to approximately 5 years, it is premised that one-time regeneration treatment is performed for two weeks, and 275-times regeneration or 27-times salt replenishment is set to the service life timing. When 275-times regeneration treatment or 27-times salt replenishment ends, it is determined to be the service life.

In the regeneration treatment in Example 2, gross amount of the salt water of 18 liters which is generated in the regeneration salt water supply device 4 is used in one-time regeneration treatment.

(4) Procedure of Regeneration Treatment Process (i) A water supply valve (not shown) is opened, and water of 18 liters is injected to the regeneration salt water supply device 40.

At this time, the injected water amount is defined by the valve opening time (one minute in Example) of the water supply valve.

(ii) The injected water is left for 50 seconds in the regeneration salt water supply device (the salt water having saturated concentration is generated).

(iii) The switching valve 35 is switched to the second position (FIG. 4(b)), and the salt water is supplied to the water softening device 30. At this time, the salt water is supplied along with the water supply, and thus, this supply is continued until the salt water of the regeneration salt water supply device 30 is not present. The supply time of the salt water until the salt water is not present is expected to be 2 minutes.

(iv) Even after the salt water is not present in (iii) (after approximately 2 minutes), the switching valve 35 is positioned at the second position, water is supplied to the water softening device 30 for 8 minutes, and thereby, the ion exchange resin is washed by water.

(v) After the water washing of the ion exchange resin of (iv) ends, the switching valve 35 is switched to the first position, and the regeneration treatment is completed.

(5) Determination of Service Life

The service life in Example 2 is determined based on 275-times regeneration.

As described above, since the sequence of the regeneration treatment of Example 2 is controlled based on the timing data and the frequency of the regeneration treatment, the control program is extremely simple.

As the regeneration salt amount determination unit which detects the amount of salt, by using the salt water concentration sensor 43 in Example 1 and using the counter of the regeneration treatment in Example 2, the timing of the salt replenishment is determined based on the salt replenishment reference. Moreover, as the regeneration salt amount determination unit, a weight sensor which detects weight of salt may be used, or a volume sensor which detects volume of salt may be used.

Industrial Applicability

As described above, according to a hot-water supply system which includes a water softening device of the present invention, since it is possible to prevent water softening treatment from being performed in a state where ion exchange resin is not regenerated due to deficiency of salt and the ion exchange resin from being deteriorated, the present invention is effective in use of the hot-water supply system which includes the water softening device.

Description Of Reference Numerals

1: hot-water supply device, 30: water softening device, 30a: ion exchange resin, 40: regeneration salt water supply device, 41: divided chamber, 41a: water level detection chamber, 42: water level detection unit, 43: salt water concentration sensor, 44: hardness meter, 45: salt water suction pipe, 45a: salt water discharging pipe, 50: control unit, 50a: reference storage unit, 50b: calculation circuit, 50c: operation storage unit, 50m: storage unit, 50x: display drive circuit, 50y: switching valve drive circuit, H: communication line, 51: display portion, RC: remote controller, P1: water supply pipe, P2: inlet pipe, P3: inlet pipe of hot-water supply device, P4: return pipe, w: salt

The invention claimed is:

1. A hot-water supply system which includes a remote controller having a display portion, a hot-water supply device and a water softening device, which includes a regeneration salt water supply device, and in which regeneration salt water is supplied from the regeneration salt water supply device, an ion exchange resin of the water softening device is repeatedly regenerated, and soft water is supplied from the water softening device to the hot-water supply device, comprising:
   a regeneration salt amount determination unit which determines an amount of salt in the regeneration salt water supply device;
   a switching valve which is positioned at an upstream side of the water softening device, is connected to a water supply pipe which supplies water to the water softening device and a soft water supply pipe which supplies soft water generated by the water softening device to the hot-water supply device, and includes a bypass circuit which bypasses the water softening device by directly connecting the water supply pipe and the soft water supply pipe; and
   a control unit which controls the switching valve, wherein the control unit includes:
   a storage unit which stores a salt replenishment reference of the regeneration salt water supply device;
   a calculation circuit which determines a timing of salt replenishment in the regeneration salt water supply device based on the amount of salt in the regeneration salt water supply device determined by the regeneration salt amount determination unit, and the salt replenishment reference;
   a switching valve drive circuit which switches the switching valve to a mode, in which the water softening device is bypassed by the bypass circuit and water is directly supplied from the water supply pipe to the hot-water supply device, based on the timing of salt replenishment in the regeneration salt water supply device which is determined by the calculation circuit; and
   a display drive circuit which displays necessity for replenishment of salt in the regeneration salt water supply device, on the display portion of the remote controller of the hot-water supply system based on the timing of salt replenishment which is determined by the calculation circuit.

2. The hot-water supply system according to claim 1, further comprising:
   a jet pump or an eject pump which is configured by a nozzle provided in the switching valve, draws up the salt water in the regeneration salt water supply device by water flow of the water supply from the water supply pipe and mixes the salt water and the supplied water, and supplies the mixed water to the water softening device.

3. The hot-water supply system according to claim 1, wherein the regeneration salt amount determination unit determines the amount of the salt in the regeneration salt water supply device based on regeneration frequency of the ion exchange resin and the amount of the salt which is consumed in each regeneration of the ion exchange resin.

4. The hot-water supply system according to claim 1, wherein the storage unit stores a regeneration reference of the ion exchange resin, and
   the calculation circuit calculates an amount of water softening treatment of the ion exchange resin, and determines a generation treatment timing of the ion exchange resin based on a calculated value of the amount of the water softening treatment of the ion exchange resin and the regeneration reference of the ion exchange resin.

5. The hot-water supply system according to claim 4, wherein the calculation circuit calculates the amount of the water softening treatment of the ion exchange resin from an operation time of the water softening device.

6. The hot-water supply system according to claim 1, wherein
   the calculation circuit is configured to determine whether salt replenishment is necessary in the regeneration salt water supply device based on the amount of salt in the regeneration salt water supply device determined by the regeneration salt amount determination unit, and the salt replenishment reference,
   the switching valve drive circuit is configured to switch the switching valve to the mode in which the water softening device is bypassed by the bypass circuit and water is directly supplied from the water supply pipe to the hot-water supply device when the calculation circuit determines that salt replenishment in the regeneration salt water supply device is necessary.

7. The hot-water supply system according to claim 1, wherein
   the calculation circuit is configured to determine whether salt replenishment is necessary in the regeneration salt water supply device based on the amount of salt in the regeneration salt water supply device determined by the regeneration salt amount determination unit, and the salt replenishment reference, and
   the display drive circuit is configured to display the necessity for replenishment in the regeneration salt water supply device when the calculation circuit determines that salt replenishment in the regeneration salt water supply device is necessary.

8. The hot-water supply system according to claim 7, wherein the switching valve drive circuit is configured to switch the switching valve to the mode in which the water softening device is bypassed by the bypass circuit and water is directly supplied from the water supply pipe to the hot-water supply device when the calculation circuit determines that salt replenishment in the regeneration salt water supply device is necessary.

\* \* \* \* \*